(12) United States Patent  
Ben-Efraim et al.

(10) Patent No.: US 7,035,620 B2
(45) Date of Patent: Apr. 25, 2006

(54) PLAYING OF AUDIO VIA VOICE CALLS INITIATED FROM VISUAL NAVIGATION

(75) Inventors: Amir Ben-Efraim, Redwood City, CA (US); Marco Del Pellegrino, San Mateo, CA (US)

(73) Assignee: At Road, Inc., Fremont, CA (US)

( * ) Notice: Subject to any disclaimer, the term of this patent is extended or adjusted under 35 U.S.C. 154(b) by 698 days.

(21) Appl. No.: 09/737,435

(22) Filed: Dec. 11, 2000

(65) Prior Publication Data

US 2004/0204116 A1 Oct. 14, 2004

(51) Int. Cl.
*H04M 11/00* (2006.01)

(52) U.S. Cl. .................. 455/412.1; 455/3.03; 455/566
(58) Field of Classification Search ............. 455/412.1, 455/412.2, 418, 566, 564, 3.03; 379/88.17, 379/88.25; 370/463; 709/217–219
See application file for complete search history.

(56) References Cited

U.S. PATENT DOCUMENTS 6,654,367 B1 * 11/2003 Kaufman .................... 370/356
2001/0043684 A1 * 11/2001 Guedalia et al. ......... 379/88.17

OTHER PUBLICATIONS

"Questions about WTAI" http://dev.forum.nokia.com/wapboard/messages/15746.html, Aug. 8, 2000, pp. 1-2.
"Wireless Application Protocol—Wireless Telphony Application Interface Specification" WAP-170-WTAI, Version Jul. 7, 2000, Copyright Wireless Application Protocol Forum LTD, 2000, pp. 1-54.
"WAPman" http://www.edgematrix.com/products/main_wapman.htm., Oct. 19, 2000, pp. 1-2.

(Continued)

*Primary Examiner*—Lee Nguyen
(74) *Attorney, Agent, or Firm*—Mary Jo Bertani; Koestner Bertani LLP

(57) ABSTRACT

Descriptions of audio contents available for playback via voice calls are displayed visually on a screen of a telephone handset (such as a cellular phone supporting Internet access, or a personal digital assistant supporting voice telephony). On selection of an audio content, the handset places a voice call to a computer that plays the audio content to the user (during the voice call). A data connection is used to retrieve description(s) for visual display, but this data connection is not used for retrieval of a file containing the audio content. Instead, a voice call is placed in the normal telephony manner, and the audio content is played by the computer that receives the voice call. The just-described method and system eliminates a prior art need for the user to navigate through a set of voice prompts to identify an audio content to be played, e.g. as required by an interactive voice response system. Instead, the user merely uses a display of the handset and the related input mechanism (such as touch screen or keypad) to navigate e.g. through a list of hits from a search engine, or through a number of categories and subcategories to identify an audio content. The combination of a conventional visual interface for navigation and a conventional audio interface for serving audio contents provides the benefits of both: the ease of navigation provided by web pages, and the quality of audio playback provided by the telephone handset.

38 Claims, 9 Drawing Sheets

OTHER PUBLICATIONS

Rytkönen, K, Mobile commerce and WML—http://www.gca/org/papers/xmleurope2000/papers/s13-01.html, Oct. 19, 2000, p. 1-15.
"Wireless Application Protocol—Wireless Telephony Application Interface Specification" WAP-169WTA, Version Jul. 7, 2000 Copyright Wireless Application Protocol Forum LTD, 2000, pp. 1-49.
A WAP Tutorial—http://www.wapdesign.org.uk/tutorial.html, Oct. 19, 2000, pp. 1-5.
"GB Direct"—http://gddirect.co.uk/ouropinions/wapimpressions.htm, Oct. 19, 2000, pp. 1-10.
Heikkinin, T, "Wireless Application Protocol"—http://www.tml.hut.fi/Opinnot/Tik-111.550/1999/Esitelmat/Wap/wap/WAP.html, Aug. 4, 1999, pp. 1-10.
"WML Tutorial"—http://www.wak-uk.com/Developers/Tutoria.html, Oct. 19, 2000, pp. 1-8.
Farley, T, "Cellular Telephone Basics: Amps & Beyond"—http://www.privateline.com/Cellbascis/Cellbasics.html, Oct. 19, 2000, p. 1-61.
"WAP Forum"—http://www1.wapforum.org/tech/terms.asp?doc=WAP-100-WAPArch-19980430-a.pdf, Oct. 19, 2000, pp. 1-3.
Wireless Application Protocol White Paper, Wap Forum, Wireless Internet Today, Jun. 2000, pp. 1-18.
"Wireless Application Protocol Architecture Specification", WAP Architecture, Verson Apr. 30, 1998.
"Wireless Application Protocol Wireless Application Environmental Overview Version 1.3", WAP-195-WAEOverview, Version Mar. 29, 2000.
"Wireless Application Protocol Wireless Application Environment Specification Version 1.3" WAP-190-WAESpec, Version Mar. 29, 2000.
"Wireless Application Protocol Wireless Markup Language Specification Version 1.3" WAP WML, WAP-191-WML, Feb. 19, 2000.
"Wireless Applications Protocol WMLScript Language Specification Version 1.2" WAP-193-WMLScript Language Specification, Jun.-2000.
"Tag/Screen image correspondence tables for I-made compatible HTML 1.0 & 2.0"http://www.nttdocomo.com/i/tag/index.html, Oct. 31, 2000, 3 pages.
"An Introduction To VoiceXML" http://www.wirelessdevnet.com/training/voicexml/voicexmloverview.html, Oct. 31, 2000, 3 pages.
"Dialogic Vocie Products D/21H D/41/H", Unknown date-believed to be prior to Dec. 11, 2000, 8 pages.
Dreier, Troy, "InfoGear iPhone", *PC Magazine*, http://www.zdnet.com/filters/printerfriendly/0,6061,2307571-50,00.html, Aug. 2, 1999, 2 pages.
"BigPlanet-iphone", http://www.bigplanet/com/products/iphone/index.html, Nov. 1, 2000, 1 page.
"BigPlanet-Using Your Phone", http://www.bigplanet.com/products/iphone/using.html, Nov. 1, 2000, 1 page.
"BigPlanet-iphone-Easy Access to the Power of the Internet", http://www.bigplanetcom/products/iphone/specifications/html, Nov. 1, 2000, 12 pages.
"BigPlanet-iPhone-Seamless Integration of Telephone and Internet", http:///www.bigplanet.com/products/iphone/whatisit.html, Nov. 1, 2000, 2 pages.
"pdQ-1900 CDMA Digital PCS Smartphone", *Qualcomm*, Feb. 19, 1999, 2 pages.
"Yahoo! Mobil Tour", http://mobile.yahoo.com/wireless/tour?.pv=yp&.pg=1&.ph=tp, Oct. 22, 2000, 7 page.
"Product Brief-Compaq BlackBerry Wireless Messaging Solution Bundle", *Compaq*, unknown date-believed to be prior to Dec. 11, 2000, 2 pages.
"RealPlayer 8 Plus User Manual", http://service.real.com/help/player/plus_manual.8/htmlfiles/notice.htm Oct. 22, 2000, 15 pages.
"WAPMan is a portable browsing device for WAP sites", http://www.option.com/Proucts/wapman.htm, Oct. 19, 2000, 2 pages.

* cited by examiner

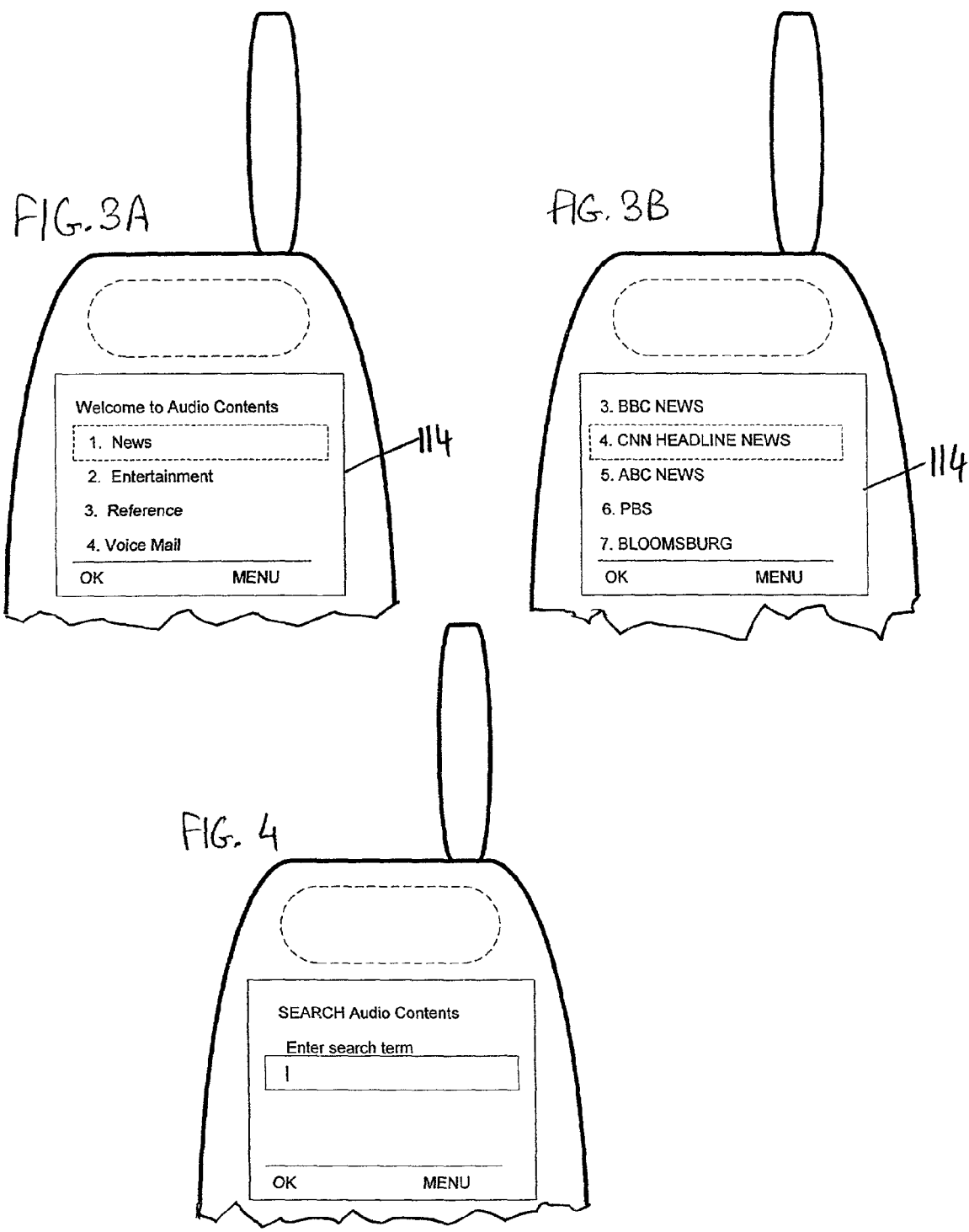

content (dbo)

| Column Name | Datatype | Length | Precision | Scale | Allow Nulls | Example Data |
|---|---|---|---|---|---|---|
| content_id | int | 4 | 10 | 0 | | 1513 |
| subcategory_id | int | 4 | 10 | 0 | | 15+300012 |
| crawl_id | int | 4 | 10 | 0 | | 1265 |
| content_num | int | 4 | 10 | 0 | | 0 |
| description | varchar | 80 | 0 | 0 | | headlines for Intel |
| crawler_info | varchar | 200 | 0 | 0 | ✓ | <NULL> |
| body_url | varchar | 400 | 0 | 0 | | |
| title_file | varchar | 127 | 0 | 0 | ✓ | <NULL> |
| title_type | char | 1 | 0 | 0 | | N |
| body_file | varchar | 127 | 0 | 0 | | \\BLUE01\content\stock\bINT.ht |
| body_type | char | 1 | 0 | 0 | | T |
| encoding_file | varchar | 127 | 0 | 0 | ✓ | <NULL> |
| encoding_id | int | 4 | 10 | 0 | ✓ | <NULL> |

FIG. 10B subcategory (dbo)

| Column Name | Datatype | Length | Precision | Scale | Allow Nulls | Example Data |
|---|---|---|---|---|---|---|
| subcategory_id | int | 4 | 10 | 0 | | 100001 |
| crawl_id | int | 4 | 10 | 0 | ✓ | 21011 |
| category_id | int | 4 | 10 | 0 | | 1 |
| description | varchar | 80 | 0 | 0 | | CNN NEWS |
| content_type | char | 1 | 0 | 0 | | A |
| prompt_file | varchar | 127 | 0 | 0 | | \\BLUE1\BW\Prompts\CNN.wav |
| prompt_type | char | 1 | 0 | 0 | | A |
| play_until | char | 1 | 0 | 0 | | 3 |
| html_name | varchar | 100 | 0 | 0 | | CNN News |
| crawler_name | varchar | 200 | 0 | 0 | ✓ | <NULL> |
| average_duration | int | 4 | 10 | 0 | ✓ | <NULL> |
| url | varchar | 256 | 0 | 0 | ✓ | <NULL> |
| active | char | 1 | 0 | 0 | ✓ | Y |
| default_chosen | char | 1 | 0 | 0 | ✓ | Y |
| quality_id | int | 4 | 10 | 0 | ✓ | 1 |
| warning_hours_num | int | 4 | 10 | 0 | ✓ | 3 |
| id_name | varchar | 256 | 0 | 0 | ✓ | 5_CNN_NEWS_GENERAL_Radio_CNN |
| active_nuance | char | 1 | 0 | 0 | | Y |

FIG. 10C category *

| Column Name | Datatype | Length | Precision | Scale | Allow Nulls |
|---|---|---|---|---|---|
| category_id | int | 4 | 10 | 0 | |
| description | varchar | 80 | 0 | 0 | |
| prompt_file | varchar | 127 | 0 | 0 | |
| prompt_type | char | 1 | 0 | 0 | |
| id_name | varchar | 256 | 0 | 0 | ✓ |

FIG. 10D user (dbo)

| Column Name | Datatype | Length | Precision | Scale | Allow Nulls | Example Data |
|---|---|---|---|---|---|---|
| user_id | int | 4 | 10 | 0 | | 8 |
| username | varchar | 10 | 0 | 0 | | 1857 |
| passwd_digit | varchar | 10 | 0 | 0 | | 6666 |
| passwd_audio | varchar | 127 | 0 | 0 | ✓ | <null> |
| first_name | varchar | 30 | 0 | 0 | | David |
| middle_name | varchar | 30 | 0 | 0 | ✓ | |
| last_name | varchar | 30 | 0 | 0 | | Park |
| birth_date | char | 10 | 0 | 0 | ✓ | 20000101 |
| zip_post | varchar | 30 | 0 | 0 | ✓ | 95070 |
| sex | char | 1 | 0 | 0 | ✓ | M |
| email | varchar | 80 | 0 | 0 | | David.Park@Bluewireless.com |
| volume | smallint | 2 | 5 | 0 | | 5 |
| speechrec_setting | char | 1 | 0 | 0 | | M |
| trace | char | 1 | 0 | 0 | | F |
| status | char | 1 | 0 | 0 | | 0 |
| content_id | int | 4 | 10 | 0 | ✓ | 1 |
| content_type | char | 1 | 0 | 0 | | R |
| last_visit | datetime | 8 | 0 | 0 | ✓ | 1/1/00 |
| user_model | varchar | 127 | 0 | 0 | ✓ | <NULL> |
| use_personalization | char | 1 | 0 | 0 | | T |
| company_id | int | 4 | 10 | 0 | ✓ | 1 |
| subscriber_id | int | 4 | 10 | 0 | ✓ | 18732169 |

FIG. 10E

PLAYING OF AUDIO VIA VOICE CALLS INITIATED FROM VISUAL NAVIGATION

CROSS REFERENCE TO RELATED APPLICATIONS

This application is related to and incorporates by reference herein in its entirety the commonly owned and concurrently filed U.S. patent application Ser. No. 09/721,012, entitled "PORTABLE BROWSER DEVICE WITH ADAPTIVE PERSONALIZATION CAPABILITY" by Claude-Nicolas Fiechter, Amir Ben-Efraim, Tea Hea Nahm, and David Hudson filed on Nov. 21, 2000 (hereinafter "the 012 application").

This application is also related to and incorporates by reference herein in its entirety the copending, commonly owned U.S. patent application Ser. No. 09/415,295, entitled "Portable Browser Device With Voice Recognition And Feedback Capability," filed Oct. 8, 1999 (hereafter "the '295 application").

CROSS REFERENCE TO ATTACHED APPENDIX

Appendix A contains the following files in one CD-ROM (of which two identical copies are attached hereto), and is a part of the present disclosure and is incorporated by reference herein in its entirety:

```
Volume in drive E is 001211_1324
Volume Serial Number is 1A53-A390

Directory of E:\

12/11/00 01:25p    <DIR>
12/11/00 01:25p    <DIR>
12/11/00 01:25p    <DIR>          WML
         3 File(s)         0 bytes
            Directory of E:\WML 12/11/00 01:25p    <DIR>
12/11/00 01:25p    <DIR>
12/11/00 01:25p    <DIR>          BIN
05/18/00 03:05a             875  HELLO.WML
05/19/00 05:27a           1,226  HIBYE.WML
05/18/00 03:05a           1,986  LOGO.WML
12/11/00 01:25p    <DIR>          PLAYLIST
12/11/00 01:25p    <DIR>          VOS
         8 File(s)     4,087 bytes
            Directory of E:\WML\BIN 12/11/00 01:25p    <DIR>
12/11/00 01:25p    <DIR>
08/07/00 02:01p           1,387  PREPPLAY.PL
08/07/00 12:32p             239  README.TXT
         4 File(s)     1,626 bytes
            Directory of E:\WML\PLAYLIST 12/11/00 01:25p    <DIR>
12/11/00 01:25p    <DIR>
12/08/00 06:41p           1,738  BUSINESS.WML
05/31/00 11:01p           3,611  EMAIL.WML
12/08/00 06:43p           1,719  ENTERT~1.WML
05/18/00 05:48a             558  FINANCE.WML
12/11/00 01:25p    <DIR>          IMAGES
12/08/00 06:45p           1,587  MARKET.WML
12/08/00 06:46p           2,603  NEWS.WML
12/08/00 06:48p           1,640  SPORTS.WML
06/01/00 11:31a           1,193  STOCKS.WML
05/19/00 11:33a             854  TABLE.WML
```

```
Volume in drive E is 001211_1324
Volume Serial Number is 1A53-A390

05/18/00 05:48a             558  WEATHER.WML
09/08/00 02:46p           2,652  WELCOME.WML
        14 File(s)    18,713 bytes
            Directory of E:\WML\PLAYLIST\IMAGES 12/11/00 01:25p    <DIR>
12/11/00 01:25p    <DIR>
         2 File(s)         0 bytes
            Directory of E:\WML\VOS 12/11/00 01:25p    <DIR>
12/11/00 01:25p    <DIR>
08/03/00 03:29p              89  COMPWAP.BAT
08/03/00 03:25p             179  MASTER.VS
12/08/00 06:39p             395  README.TXT
08/03/00 03:38p             136  RUNWAP.BAT
08/04/00 07:14p             691  WAPTEST.VS
         7 File(s)     1,490 bytes Total Files Listed: 38 File(s)   25,916 bytes
                                      0 bytes free
```

The files of Appendix A form source code of computer programs and related data of an illustrative embodiment of the present invention. The files welcome.wml, news.wml, business.wml, email.wml, entertain.wml, finance.wml, market.wml, sports.wml, stocks.wml, table.wml, weather.wml, hello.wml, hiBye.wml and logo.wml provide WML implementation of visual navigation software in a phone to identify audio content for playing. The remaining files contain source code for use in a Personal Computer (such as a PC available from Dell Corporation), running the Microsoft NT Operating System. File prepPlayer.pl is for accessing the database to determine the latest content for a particular subcategory; installed in a Personal Computer which needs to be able to execute Perl CGIs. Specifically, prepPlayer.pl is a PERL script implementation of card generation software for use in the Personal Computer to provide telephone number and dialing instructions to cell phone in response to identification of selected audio content by the cell phone.

Files master.vs, waptest.vs, comp.wap.bat, runwaptest.bat and readme.txt form an audio server in a Personal Computer that responds to an incoming voice call from a phone. This software reads the content of a file which currently sits on the WAP web server machine. The just-described file has in it the filename (or names) of the contents to be played. This software should be installed on the WAP voice server, and started with the runwaptest.bat batch file. This software can be compiled with a VOS compiler available from Parity Software of 3 Harbor Drive, Sausalito, Calif.

Microsoft SQL server may be used to generate a database for use with the above-described software in the Personal Computer.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND

Certain cellular phones (also called "wireless phones" and "cell phones") have the capability to place a phone call and also provide a wireless link to the Internet for the download of data that is visually displayed to the user. The data is presented on a display (such as a liquid crystal display (LCD) or a plasma display) by micro browser software that is programmed into a memory of the cell phone and executed by a processor (such as a digital signal processor) also included in the phone. The data may be displayed in a hierarchical manner, wherein a home page contains a number of categories for selection, and a selected category in turn may contain a number of categories, and so on. At some point in the hierarchy, a category contains a number of items of data (also called "content"). The data may also be provided in a list, based on use of a search term to find items in the list. Therefore, a user can use a cellular phone to find a telephone number of a restaurant, and the user can then place a voice call to speak with an employee of the restaurant, in the normal manner of using a telephone.

Wireless application protocol (WAP) is a specification (see http://www.wapforum.org/what/technical.htm) that enables cell phones to access data from the Internet. Such a cell phone interprets files that are written in a tag-based language called Wireless Markup Language (WML), which is a DTD of XML (eXtendable Markup Language). Telephony operations in such a device can be controlled through a standard called Wireless Telephony Application (WTA). In the following example, a WML file when executed by a cell phone causes the cell phone to dial the phone number 555-1212 for Directory Assistance in response to user selection of the link:

```
<wml>
  <card>
    <a href="wtai://wp/mc;5551212"> Directory Assistance</a>
  </card>
</wml>
```

For other such mechanisms, see the specification "WAP-170-WTAI" version 7 Jul. 2000, entitled "Wireless Application Protocol Wireless Telephony Application Interface Specification" available from www.wapforum.org.

Certain cell phones, such as Nokia 7110 do not conform to the WTAI standard. However, such phones, may have a different interface. For example, Nokia 7110 allows selection of a "use number" function (from various options) when a number on a page is displayed, and when selected automatically disconnects the user from the Internet and sets the phone up for use (by operating a green telephone button to make the call). Other Nokia phones appear to allow pressing a "dial" phone button to cause the voice call to be initiated using the displayed phone number.

Instead of cell phones, other devices such as personal computers running MS Windows NT, and PDAs running Palm OS™ (e.g. Palm IIIc, IIIe, IIIx, V and Vx platforms) may interpret WML pages, by use of WAP simulators, such as WAPman browser available from http://www.edgematrix.com, WinWAP 3.0 available from http://www.slobtrot.com/eng/index.html, and Mobone WAP browser available from http://www.mobone.com/wapbrowser.

According to EdgeMatrix, the WAPman browser can also be used with fixed-line videophones and in-car Internet devices. Another such device is Qualcomm's pdQ which puts an actual version of 3Com's Palm PDA interface on the cell phone's screen. See also the iPaq Blackberry Handheld available from Compaq Corporation.

A message posted on Aug. 8, 2000 at the Nokia WAP Discussion Board suggests that a cell phone can dial a phone number of a voice mail system (an interactive voice response system) based on instructions in a WML page, and the message suggests the need to dial an additional number after dialing the phone number. Specifically, the message asks if there is a way to pass a number (such as 1, 2, or 3) along with a telephone number. The message suggests the example of dialing 43232135 (telephone) and then key in the number "2." Moreover, instead of WML pages, other cell phones may interpret Handheld Device Markup Language (HDML) pages that are also available through the Internet. User interaction with such cell phones is illustrated at, for example, http://mobile.yahoo.com/wireless/tour?.pv=yp&.pg=3&.ph=tp.

To the Applicant's knowledge, cell phones do not have the ability to execute RealPlayer software (available from www-.real.com) that is commonly used in personal computers. Specifically, a computer programmed with the RealPlayer software can playback audio (or video) that is stored locally in the computer, as well as playback a clip that is being played in real-time over the Internet (also called "streamed content") and that is being buffered locally. The RealPlayer provides access to continuous real-time streaming media from a variety of radio stations throughout the world (usually a combination of live and pre-recorded programs). The user can select a station with the Radio Tuner feature in the Radio menu. Opening the Radio Tuner takes the user to a site at Real.com. By following the links, a user can select and play radio broadcasts. The user can also search for stations by their name/call letters, or browse through available stations sorted by category.

The RealPlayer also provides access to "channels" that provide one-click access to content that is updated on a frequent basis. Specifically, a service called "My Channels" provides the user with up-to-date headlines from all of the user's selected Channels when connected to the Internet. Headlines for each Channel appear to the right of the Channel's icon as the user moves the cursor over the Channels. The user can also set the Headlines to display and scroll automatically. Moreover, headlines update automatically while the user is connected to the Internet.

The RealPlayer includes a "Search" feature that offers the user the opportunity to type in words or phrases of interest and looks for streaming media related to those subjects. Search returns a results page similar to those returned when the user searches for Web pages. The RealPlayer also includes a "Guide" feature that takes the user to a media hub for free Internet audio and video software and programming. At this website, the user can find programming featured on the Internet and play it with one click. The user can choose from more than 2,500 radio and television stations, 8,000 Web sites and 500 daily live events. To the Applicant's knowledge, the RealPlayer is limited to computers, and is not available for cell phones.

SUMMARY

A system and method in accordance with this invention visually display on a screen (also called "monitor") of a telephone handset (such as a cellular phone supporting Internet access), descriptions of audio contents that are stored in a computer readable storeage medium and that are available for selection by the user. On selection of an audio content description, the handset places a voice call to a computer that plays the audio content to the user during the voice call. The telephone handset uses a data connection to retrieve the description(s) for visual display, but this data connection is not used for retrieval of a file containing the audio content. Instead, a voice call is placed in the normal telephony manner, and the audio content is played back to the user by the computer that receives the voice call. The system and method are implemented by a single business that (1) makes accessible to telephone handsets the descriptions of audio contents and also (2) plays the selected audio content over the voice call.

In one implementation, the telephone handset conforms to the WAP protocol, and the audio content descriptions are provided as WML cards. Such WML cards may identify a number of audio contents by description (either in text or graphics), and also by one or more corresponding telephone numbers that may be used to place a phone call to play the respective audio contents. Therefore, at the time of visual display of the audio content descriptions, the telephone handset already contains at least one phone number that is to be dialed. A user's selection of an audio content causes the handset to dial such a phone number (either automatically or after the user approves such dialing by pressing a button on the handset), thereby to set up a voice call for playback of the audio content.

In one embodiment, the computer assigns, ahead of time, a unique phone number to each audio content that is available for playback. Assignment of unique phone numbers is done independent of the users and remains static for a long period of time, e.g. a few days. In an alternative embodiment, all of the available audio contents are not identified by unique phone numbers ahead of time and instead one or more phone numbers are shared across multiple users. In this alternative embodiment, the method and system keep track of which descriptions are being provided to which users (that are currently navigating the available audio contents) at any given time. This procedure is hereinafter called "maintaining state." In one implementation, the same phone number is dialed by all users. When a phone call comes in, for playback of an audio content, the computer identifies the user from information provided by the handset (e.g. via subscriber identifier, such as the MSN and/or ESN that are programmed into each cell phone, or via caller id), and the appropriate audio content is identified based on the user's state that is being maintained. In another implementation, one or more phone numbers are assigned dynamically (e.g. several times a day or on demand) to audio content descriptions that are to be displayed to users.

Depending on the embodiment, a computer process (also called "audio playback process") that plays an audio content in response to a voice call initiated from the handset may be integrated with or separate from another computer process (also called "audio description process") that initially provides the audio content descriptions. When different, the two processes are coupled to one another to exchange information therebetween. The two processes may be executed in the same computer or in different computers that are linked to one another.

BRIEF DESCRIPTION OF THE DRAWINGS

FIGS. 3A and 3B illustrate, in block diagrams of the cellular phone, visual navigation by browsing to obtain the list illustrated in FIG. 2.

FIG. 4 illustrates, in a block diagram of the cellular phone, a form for entry of a search term to be used to obtain the list illustrated in FIG. 2.

FIGS. 10B–10E illustrate tables in a database for use with the method described in FIG. 10A.

DETAILED DESCRIPTION

Figure 1:
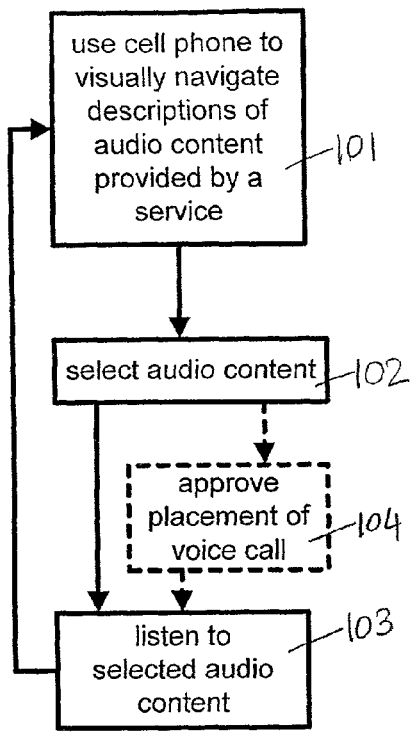
FIG. 1 illustrates, in a flow chart, a method of playing audio content via voice calls initiated from visual navigation in one embodiment of the invention.

In accordance with the invention, a system and method make available to the users of cell phones, a number of descriptions of audio content and on selection of one of the audio contents, supply the selected audio content through a voice call. Therefore, in accordance with the invention, the user uses (as illustrated by operation 101 in FIG. 1) a cellular phone 110 (FIG. 2) to visually navigate the descriptions in list 111 that describe audio contents available for playback.

Figure 2:
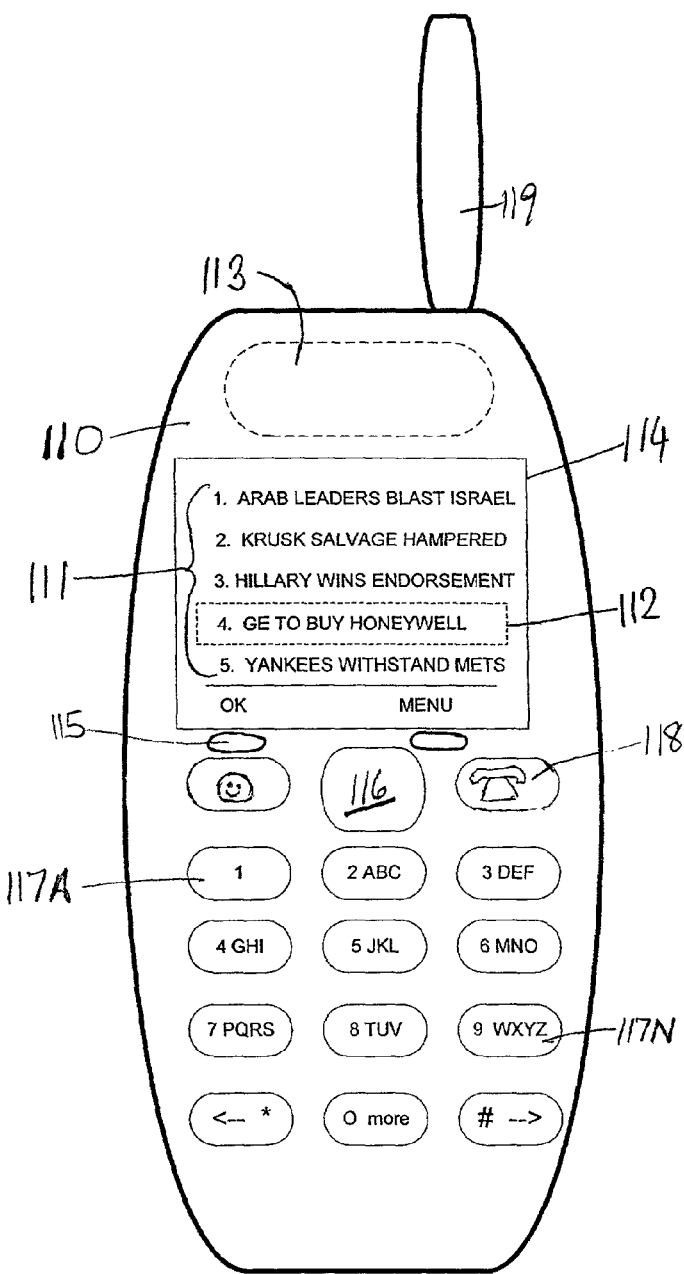
FIG. 2 illustrates, in a block diagram of a cellular phone, a list of descriptions of audio content available for selection by the user, when performing the method of FIG. 1.

In one embodiment, a business supplies to cell phones a list of categories (e.g. as illustrated in FIG. 3B) and under each category a list 111 of descriptions of audio contents all through a data connection, and a user visually navigates through such descriptions to make a selection. The user may select (as illustrated by operation 102) an audio content described by a headline 112 (see FIG. 2) for playback. Next, the same business that supplied the descriptions also plays the selected audio content on the user's phone 110, in response to a voice call placed by the user's cell phone 110. The user listens (as illustrated by act 103 in FIG. 1) to the playback of the selected audio content through speaker 113 of the cellular phone 110 (FIG. 2). The combination of a cell phone's visual interface for navigation, and the cell phone's audio interface for playing of audio content provides the benefits of both: the ease of navigation provided by web pages and the quality of audio playback provided by a voice call of the type normally placed by a telephone handset.

In one implementation, such a business generates descriptions in list 111, and either generates the audio contents or licenses the audio contents for playback to the cell phone users. For example, the audio contents may be licensed from an established news service, such as BBC. Therefore, depending on the implementation, the business may create, modify, and/or combine or split up audio contents (e.g. may break up the hour long news report "BBC World Service" into individual news stories, and may make up a headline for each news story).

Depending on the embodiment, the audio signal may be either modulated directly on to a carrier or converted to digitized samples (e.g. at about 8000 samples per second) and transmitted as 1s and 0s. If a wireless link is used, the same link may be shared by the data connection and by the voice call, with data transfer suspended during the voice call and resumed on completion of the voice call (when the computer finishes playing the audio content). Therefore, such use of the same link, for the voice call and for the data connection, is mutually exclusive. Alternatively, depending on the implementation, a wireless link may be set up and torn down for each of: voice call and data connection, and in such an implementation the user may be billed at different rates for the voice call and for the data connection.

Note that the voice call of one embodiment is placed in the normal telephony manner, and is therefore different from a "Voice Over IP" call (wherein IP is an abbreviation for Internet Protocol). This is because a data connection is not used (in this specific embodiment) for transfer of the audio contents that are played by the user's phone 110, unlike the Real Player software that uses the TCP/IP connection to transfer audio files.

Although cellular phone 110 is illustrated in FIG. 2, any other handheld device having a monitor for visually displaying a list of audio content descriptions, a speaker for playing of selected audio content, telephone circuitry for placing a voice call, and a modem for forming a data connection to obtain the descriptions can be used in accordance with the invention. Depending on the embodiment, the modem may form the data connection over the voice call, or form the data connection independent of the voice call (e.g. over a Bluetooth link as in Ericsson R320 cell phone). Examples of other handsets include, for example, a personal digital assistant (PDA) or a handheld personal computer.

Depending on the type of cellular phone or other telephone handset, user approval may be required for placement of a voice call (as illustrated by operation 104 in FIG. 1) between the acts of selecting the audio content and listening to the selected audio content. The approval in operation 104, and the selection of audio content in operation 102 may be performed in the normal manner for example by touching an "OK" button 115 (FIG. 2), or even via voice commands from the user if the system or if cell phone 110 includes voice recognition functionality as described in, for example, the '295 application incorporated by reference above.

Also depending on the embodiment, a handset of the type described herein may make the voice call either over a land line or over a wireless link. One example of a handset that uses a land line for telephony and another for Internet access is iPhone (available from www.bigplanet.com), which is described as an integrated telephone and Internet access device, with a built-in touch screen, keyboard, modem and software. In another example, a handset that uses one wireless link to handle both a voice call and a data connection is the pdQ available from www.kyocera-wireless.com.

List 111 (FIG. 2) displayed on monitor 114 can be obtained by a user in the normal manner, for example by browsing (see FIGS. 3A and 3B), or by searching (see FIG. 4). Specifically, in FIG. 3A, a server that provides the audio contents has a website that lists a number of categories, such as, news, entertainment, reference and voice mail. On selection of one of these categories, e.g. the news category, a number of subcategories are displayed on monitor 114 (FIG. 3B). The user can select one of the subcategories, e.g. CNN Headline News, to obtain list 111 illustrated in FIG. 2. Alternatively, as illustrated in FIG. 4, the user may search for items of interest by entering a search term, thereby to obtain list 111 of FIG. 2. Therefore, the user obtains list 111 that describes a number of audio contents available for playing through speaker 113 by visual navigation of various choices displayed on monitor 114.

Depending on the embodiment, the visual navigation by the user may be assisted by personalization software that may, for example, display lists of categories, subcategories or descriptions of audio content in a prioritized manner, based on the user's past behavior and/or the user's expressed preferences, as described in, for example, the M-9477 application incorporated by reference above. Also depending on the embodiment, the audio contents may be generic in the sense that any user can access the same audio contents, or the audio contents may be specific to the user in the sense that only a particular user can access the audio contents. Examples of generic audio contents include news and weather reports. Examples of the specific audio contents include voice mail messages that are accessed via visual navigation as described herein.

In one embodiment, a microprocessor 139 (also called "WAP microprocessor") in cell phone 110 (see FIG. 6B) uses a data connection (see operation 121 in FIG. 5) to receive list 111 of the descriptions of audio content that are available for playing through speaker 113. List 111 may be received as a portion of one or more WML card(s) that are stored in a memory 137 of cell phone 110 and that are interpreted (i.e. executed) by WAP microprocessor 139. Therefore, in act 122, microprocessor 139 visually displays list 111 on monitor 114. Thereafter, cell phone 110 waits (see operation 123 in FIG. 5) to receive from the user a selection of one of the displayed descriptions.

In response to user selection, cell phone 110 does not use the data connection described above in reference to operation 121 to retrieve the selected audio content. Instead, microprocessor 139 (under control of instructions in memory 137) causes a transceiver 138 (also called "voice call transceiver") in cell phone 110 to place a voice call (see operation 124 in FIG. 5), for playing the selected audio content through speaker 113 (FIG. 2). Transceiver 138 includes circuitry that is normally used to place a voice call, e.g. in case of digital wireless, an analog-to-digital converter to convert a sound signal from a microphone in to digital form for transmission by antenna 119, and similarly audio in digital form received from antenna 119 is converted into analog form by a digital-to-analog converter for supply to speaker 113. Transceiver 138 also includes, in case of a cell phone, the wireless circuitry normally used to set up and tear down voice calls over a cellular telephony network.

Thereafter, microprocessor 139 in cell phone 110 waits (see operation 125 in FIG. 5) for the voice call to be completed, and on completion of the voice call returns to act 121 (described above). Note that during the voice call, the WAP microprocessor 139 is not used at all. Instead, only the voice call transceiver 138 is used, and performs the task of receiving the audio and playing the audio through speaker 113, in the normal manner of processing a voice call. Specifically, the audio signal received from antenna 119 is passed by the voice call transceiver 138 directly to speaker 113. In contrast, when using the data connection to download descriptions 111 for visual display, WML microprocessor 139 is used to execute instructions in the WML card(s) that are temporarily held in memory 137.

As the audio played on speaker 113 is obtained through the normal telephony voice call in this embodiment, the quality is significantly better than the quality of a voice over IP telephone call. For this reason, in this embodiment the audio is played on speaker 113 as soon as call setup is completed (e.g. instantaneously), and is played continuously until the end without any interruptions. There is no "streaming" or "buffering" of the type normally performed by the Real Player (see www.real.com). Therefore, there is no initial delay caused by Internet in the audio playback of this embodiment. Also in this embodiment, there is no delay during the call, e.g. due to "congestion" on the Internet. The above-described visual navigation of choices eliminates the prior art need for a user to navigate through a set of voice prompts to identify an audio clip to be played, e.g. as required by a voice mail system. Instead of using voice recognition as described above, a different telephone handset may use a different input mechanism for the selection of audio content description during visual navigation, e.g. a touch screen.

Figure 6A:
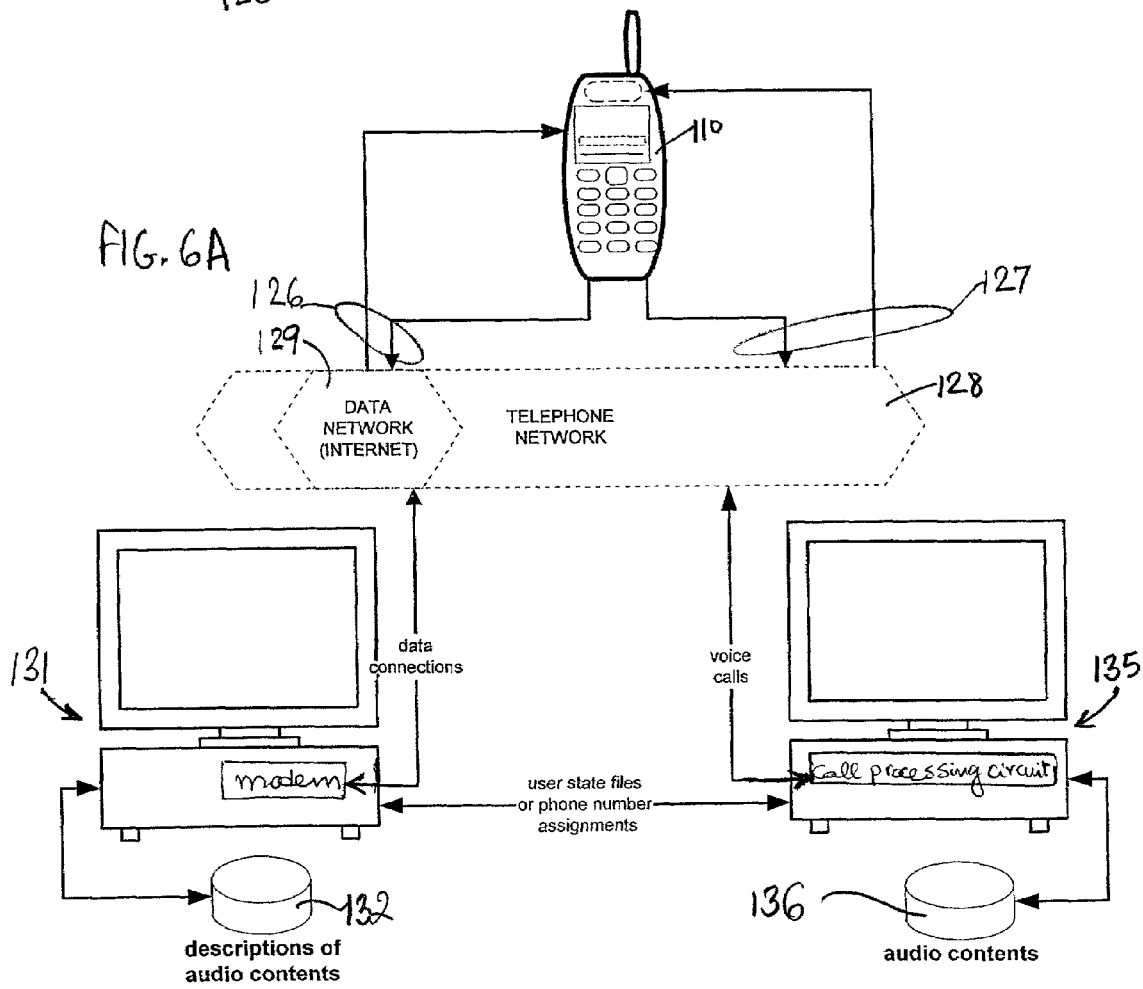
FIG. 6A illustrates, in a system level block diagram, interconnections between the cellular phone of FIG. 2, and one or more servers that provide text content for visual navigation, and audio content during voice calls in response to the operations illustrated in FIG. 5.

The above-described distinction between using a data connection to obtain the text content for visual navigation, and using the voice call to provide the audio content played on speaker 113 is a critical aspect of this embodiment. For this reason, FIG. 6A illustrates data connection 126 separate and distinct from voice call 127 although in this embodiment cell phone 110 uses the same wireless medium to transfer both contents. Note that in other embodiments, there may be no such distinction, e.g. a data connection may be used to obtain the text content and the same data connection may be used to carry a voice call, e.g. as in Voice Over IP.

In one specific implementation, cellular phone 110 forms a data connection with computer 131 that provides the list of descriptions from database 132. Computer 131 is equipped with one or more modem(s) (not labeled) or routers that are connected to the Internet, in the normal manner. Computer 131 may include a database as described below. Cellular phone 110 places the voice call to another computer 135 that plays the audio contents from another database 136. Computer 136 is equipped with one or more telephone call processing circuits (such as the D/41H board available from Dialogic Corporation of Parsippany, N.J.) and driver software for use of such circuits. The call processing circuits (not labeled) of computer 136 are connected to the telephone network 128 in the normal manner.

Note that in other implementations computers 131 and 135 may be replaced with a single appropriately programed computer or hard wired circuitry or some combination thereof that performs the functions of both computers 131 and 135. Moreover, such functions may be performed by two or more separate processes in the single computer, or all functions may be performed by a single integrated process. For this reason, the term "logic" is used to refer to a computer executing a group of software instructions or a portion of hard wired circuitry or some combination thereof that performs a specified function (such as one logic providing an identifier of an audio content to another logic). Regardless of how many logics are used to support method 129 of FIG. 5, all such logics are operated by the same business, so that they interoperate seamlessly with one another.

Use of a cell phone 110 or other handheld device as described herein has the advantage of providing the most current content (e.g. news), as compared to, e.g. the Rio 600 (available from S3.Inc. of Santa Clara, Calif.) that merely stores and plays back MP3 files. Moreover, cell phone 110 or other handheld device uses a voice call directly, because the audio is played at the other end of the voice call by a computer, as compared to Rio 600 which uses the TCP/IP stack to download the MP3 files. In two different implementations of method 120 (FIG. 5), the audio contents are either assigned phone numbers ahead of time and such assignments are kept static, or alternatively the phone numbers are assigned about the time of selection of audio contents in a dynamic manner. In case of the static assignment of phone numbers, if two separate computers 131 and 135 are used, the computer that makes the assignments (either of 131 and 135) provides a list of phone numbers and the corresponding audio contents to the other computer, e.g. through a database that may be commonly accessed by the two computers. In case of dynamic assignment, computer 131 that provides the audio content descriptions also provides the state of the user at the time of selection to computer 135 so that each incoming call is appropriately matched to the audio content selected by the user that initiated the incoming call.

Figure 7:
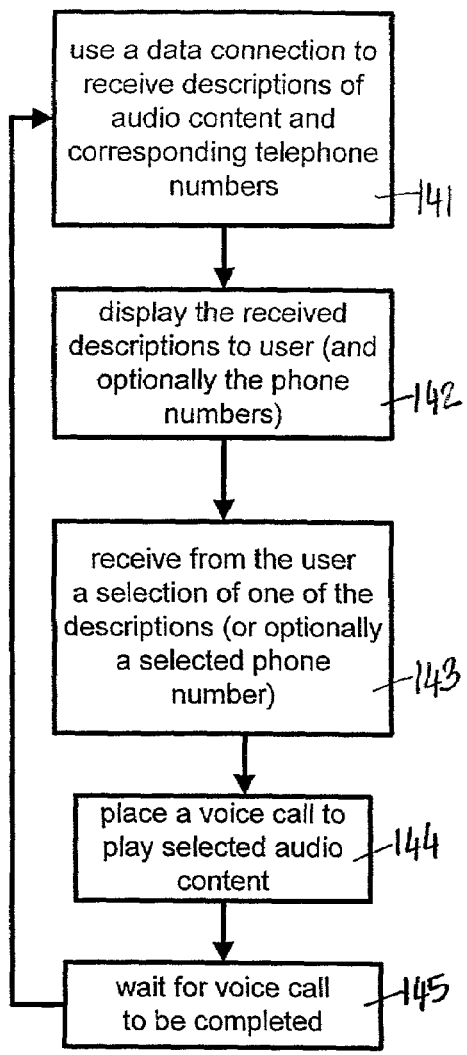
FIGS. 7 and 8 illustrate, in flow charts, two alternative implementations of the method illustrated in FIG. 5.

When a static assignment of telephone numbers is being used, cell phone 110 may implement method 140 (FIG. 7). Specifically, in act 141, cell phone 110 uses data connection 126 to receive descriptions of audio content and also the corresponding telephone numbers that are to be dialed for playing of the audio content. Thereafter, in act 142, cell phone 110 displays the received descriptions to the user. Depending on the variant, cell phone 110 may or may not display the corresponding telephone numbers. Thereafter, in act 143, cell phone 110 receives from the user a selection of one of the descriptions when the user presses button 115 (see FIG. 2). Alternatively, a user may simply select the telephone number if such phone number is displayed in act 142 (FIG. 7) as described above. Next, in act 144, cell phone 110 places a voice call using the telephone number of the selected description, thereby to play the selected audio content. Next, cell phone 110 waits for the voice call to be completed in act 145, which may happen either on completion of playing of the audio content by computer 135 or in response to the user touching the "call" button 118 (to terminate the voice call).

Method 140 (FIG. 7) can also be performed with the dynamic assignment of telephone numbers to descriptions in list 111, immediately prior to the transfer of these descriptions to cell phone 110. For example, if five descriptions of news clips are displayed in list 111, five unique telephone numbers may be dynamically assigned to identify each of the five different news clips. In such a case, the state of each user is maintained, so that computer 135 is informed as to which particular phone number corresponds to which particular audio clip to be played for this particular user. Therefore, in such an example, other users can simultaneously receive the same five phone numbers even if the corresponding audio clip descriptions being presented to them are different (e.g. top five hit songs), because their states uniquely identify such descriptions to computer 135. Such dynamic assignment of telephone numbers to the descriptions that are to be displayed to each user has the advantages of reusing the telephone numbers across multiple users, and also using fewer telephone numbers than would be otherwise required if a unique phone number is to be assigned to each audio content.

Regardless of whether the telephone number assignment is static or dynamic, the card received in method 140 by cell phone 110 has the following code in one example.

```
<wml>
<card>
    <a href="wtai://wp/mc;5551101"> 1. ARAB LEADERS BLAST ISRAEL</a>
    <a href="wtai://wp/mc;5551102"> 2. KRUSK SALVAGE HAMPERED</a>
    <a href="wtai://wp/mc;5551103"> 3. HILLARY WINS ENDORSEMENT</a>
    <a href="wtai://wp/mc;5551104"> 4. GE TO BUY HONEYWELL</a>
    <a href="wtai://wp/mc;5551105"> 5. YANKEES WITHSTAND METS</a>
</card>
</wml>
```

In one implementation, the above-listed code is received in a single message. In an alternative implementation, only the descriptions are received in a message (e.g. in one card) and only the phone numbers are received in another message (e.g. in another card), and the phone numbers are related to their respective descriptions by identifiers, e.g. the numbers 1–5 in the above-listed code may be used as such identifiers. In the alternative implementation, such an identifier is passed from one card to another card, to identify the phone number to be dialed.

When cell phone 110 executes the above WML code, the moment a user selects a description, the corresponding telephone number is automatically dialed. For example, if the user selects "HILLARY WINS ENDORSEMENT," immediately the number 555-1103 is dialed by the cell phone. Note that instead of WML, another language, such as "i-mode" compatible HTML as defined by DoCoMo of NTT, at for example www.nttdocomo.com can also be used in the manner described herein, with an appropriate instruction (also called "tag") to dial a specified phone number.

Figure 5:
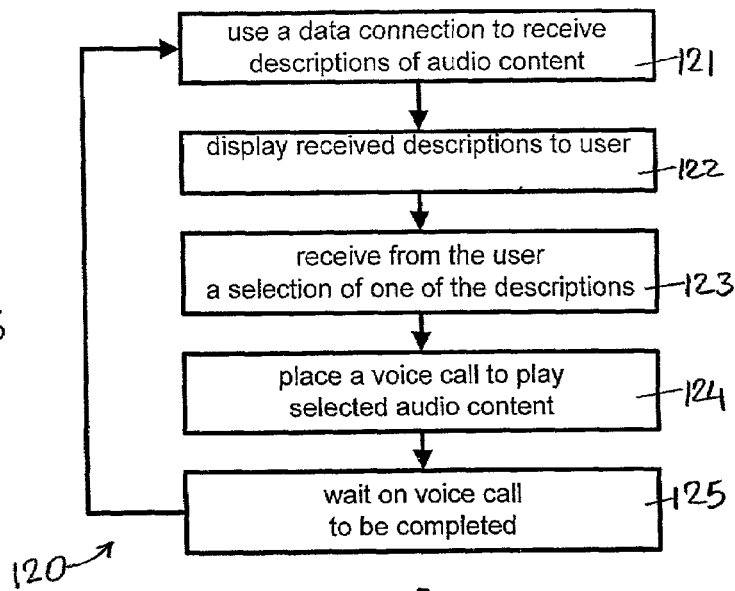
FIG. 5 illustrates, in a flow chart, operations performed by the cellular phone of FIG. 2 in one embodiment.
Figure 6B:
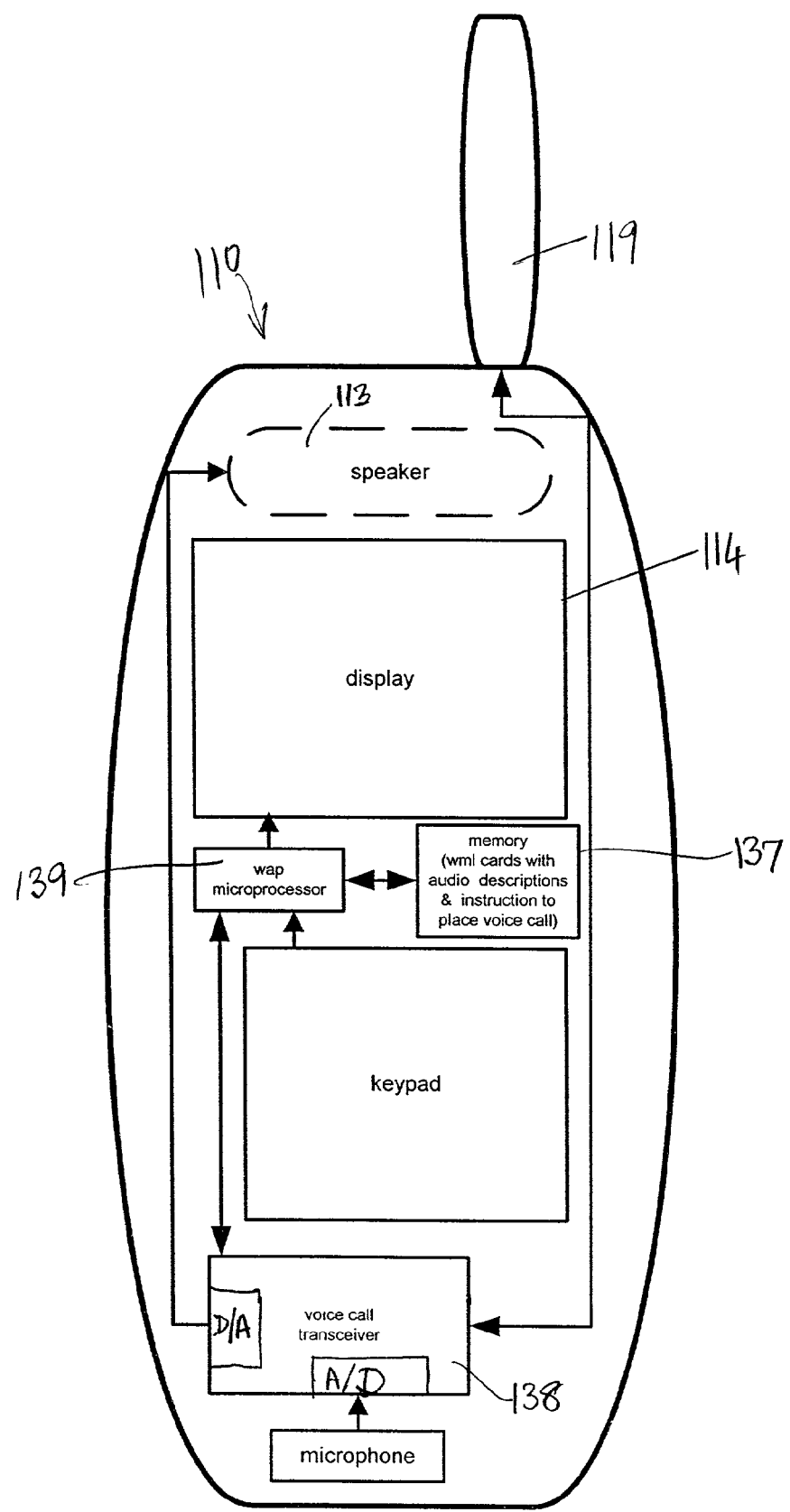
FIG. 6B illustrates, in a device level block diagram, various components in the cellular phone of FIG. 2, and their use in forming the two kinds of connections.
Figure 8:
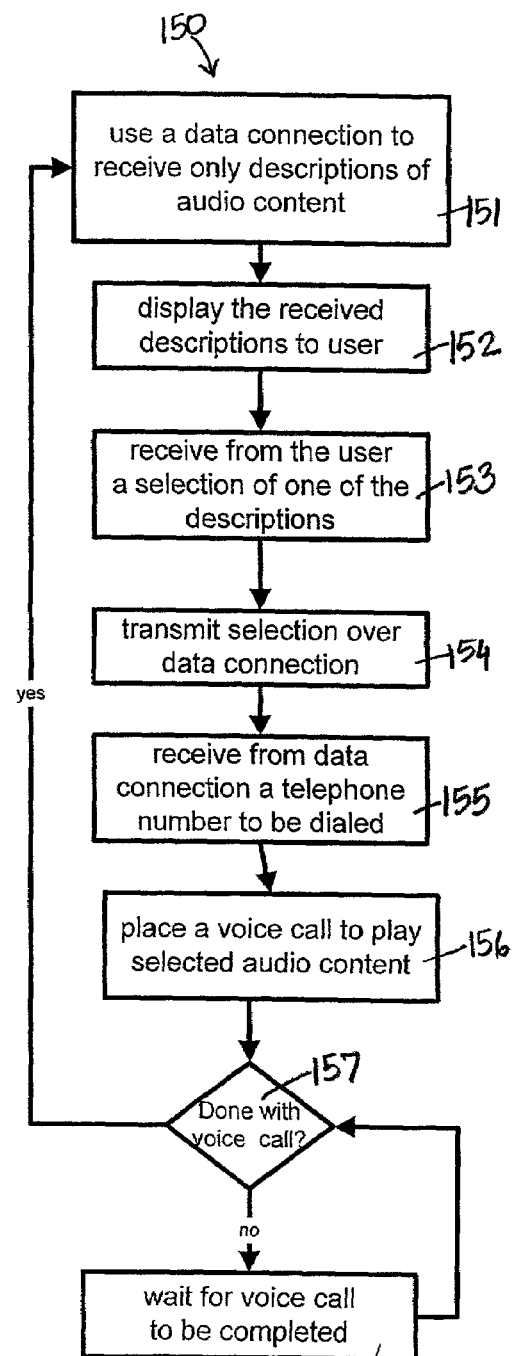

In another embodiment, method 150 (FIG. 8) implements the method 120 illustrated in FIG. 5 by not providing to cell phone 110 a list of telephone numbers that correspond to descriptions in list 111. Instead, as soon as the user selects one of the descriptions in list 111 cell phone 110 transmits the selection over the data connection to computer 131 that in turn responds by providing a telephone number to be dialed for playing of the selected audio content. Specifically, in act 151 (FIG. 8), cell phone 110 receives only the descriptions of audio content through data connection 126, and does not receive any telephone numbers, but receives identifiers (such as the number "10000001" for the category CNN as illustrated in news.WML of Appendix A). Thereafter, in act 152, cell phone 110 displays the received descriptions as list 111 on monitor 114 (FIG. 2). Next, in act 153, cell phone 110 receives from the user, e.g. via operation of scroll button 116 to move cursor 112 over one of the five descriptions, and ok button 115, to indicate a selection of the highlighted description in list 111. Next, cell phone 110 transmits (in act 154 of FIG. 8) an identity of the selected description, e.g. transmits the number 1000001 over data connection 126 (FIG. 6A), e.g. by execution of the "DoPlay" card (see file "news.WML" in Appendix A):

```
<card id="DoPlay">
    <onevent type="onenterforward">
        <go href="http://63.199.168.230/cgi-bin/
        prepPlayer.pl?subCatId=$(subCatId)&retF
        =news.wml&amp;retC=News" />
    </onevent>
</card>
```

In the above "href" statement, the file "prepPlayer.pl" (see Appendix B) identifies a PERL script to be played by computer 131 and "subCatId" represents the value of the selection made by the user that is passed to the PERL script. In the above statement, the argument retF identifies the WML card "news.wml" to be loaded into cell phone 110 on completion of the audio playback and argument retC identifies an argument "News" that is to be passed to the WML card. Arguments retF and retC are not critical to the implementation and may be skipped in other implementations.

Next, in act 155, cell phone 110 receives over data connection 126 a telephone number that is to be dialed for playing of the audio content described in selection 112. In response, cell phone 110 places a voice call (see act 156 in FIG. 8) using the telephone number received over the data connection 126. The voice call is placed independent of the data connection as described above. Specifically, if the same wireless link is shared by the data connection and the voice call, the data connection is suspended for the duration of the voice call and is resumed on voice call completion. If different links are used, voice call and data connection may be both active simultaneously. If the voice call is completed (see act 157) cell phone 110 returns to act 151, e.g. to allow the user to continue the visual navigation as described above. If the voice call is not completed, cell phone 110 goes to act 158 to wait for the voice call to be completed.

Figure 9:
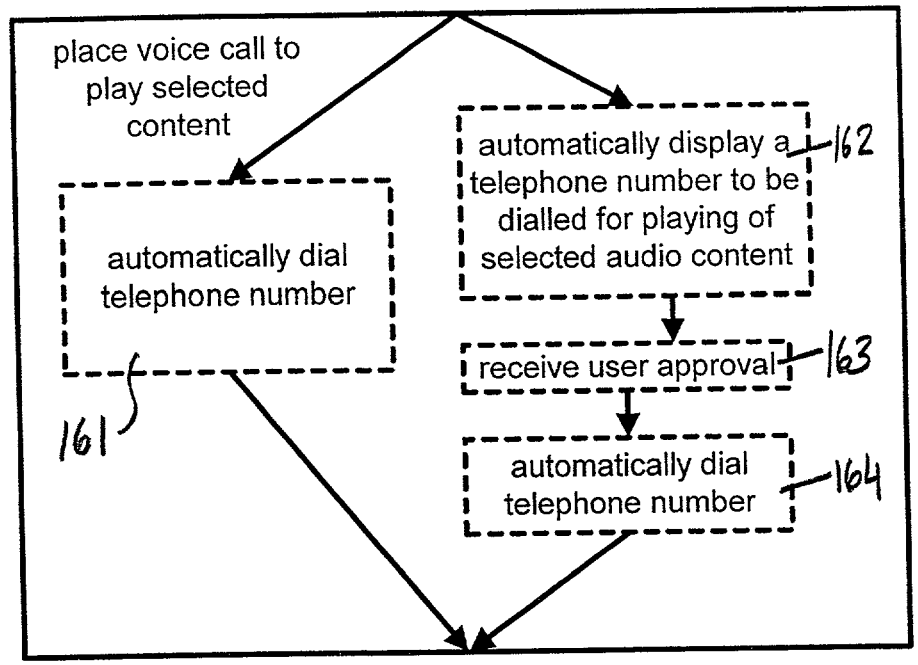
FIG. 9 illustrates, in a flow chart, acts performed during the operation of placing voice calls illustrated in FIG. 5.

Note that placement of voice calls in acts 124, 144 and 156 described above can be performed in one of two different ways. In one implementation, the voice call is placed by automatically dropping the call currently used for data connection and dialing the telephone number (see act 161 in FIG. 9) without any user involvement. Therefore, in such an implementation, the user is not even aware that a voice call is being placed and instead simply hears the sound played through speaker 113 (FIG. 2). Alternatively, in another implementation, cell phone 110 displays on monitor 114 the telephone number that is to be dialed for playing of the selected audio content. Thereafter, cell phone 110 waits to receive the user's approval (see act 163 of FIG. 9). On receipt of the user approval, cell phone 110 automatically drops the data connection and dials the telephone number in act 164 (because data connection and voice call are mutually exclusive in this embodiment, although both may be simultaneously used in other embodiments). Therefore, in the alternative implementation, the user is made aware of the telephone number that is about to be dialed, and must approve the dialing of such telephone number. Note however that even in this alternative implementation, the user is not required to touch any of numeric keys 117A–117N (FIG. 2) to physically dial the telephone number.

Figure 10A:
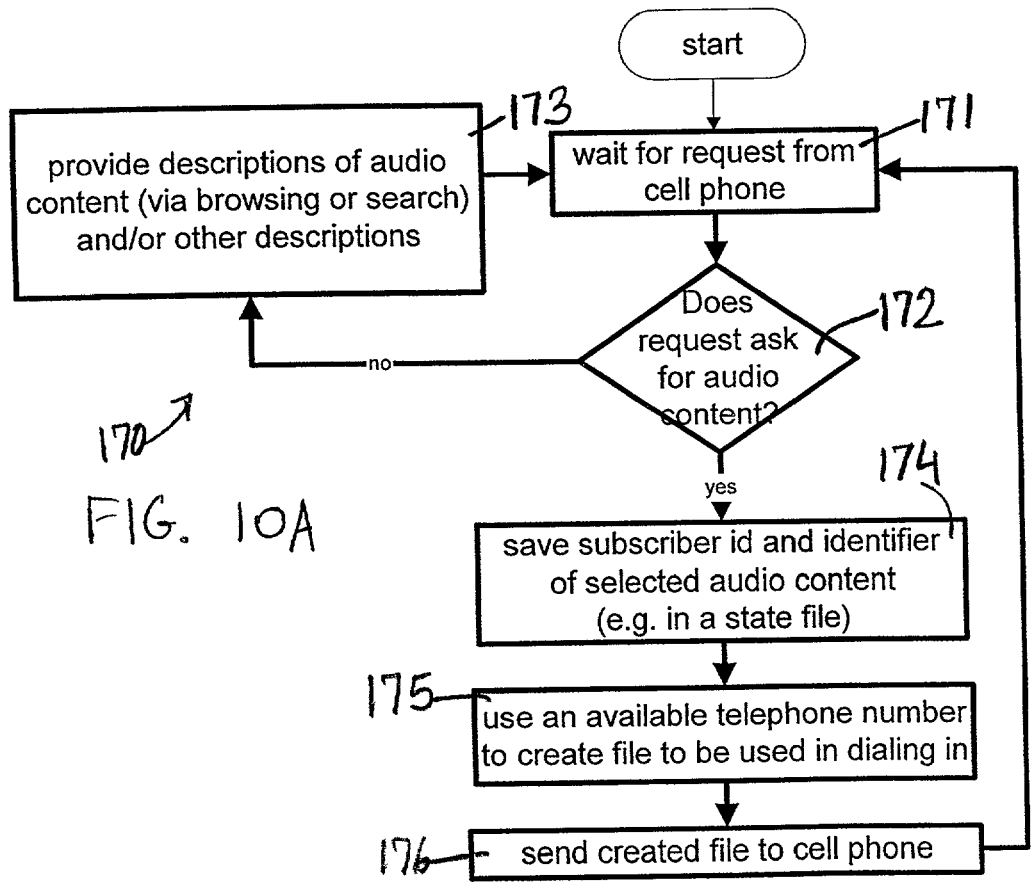
FIG. 10A illustrates, in a flow chart, operations performed by a server to provide descriptions for use during visual navigation as described in reference to FIG. 8.

In one embodiment, a process in computer 131 performs method 170 (FIG. 10A). Specifically, in act 171, computer 131 waits for a request from a cell phone, such as phone 110. Thereafter, in act 172, computer 131 checks to see if the request from cell phone 110 is asking for audio content. If not, computer 131 goes to act 173 and provides the descriptions of audio content or other such descriptions in the normal manner of a web server, such as the Apache server (or Microsoft's Internet Information Server) that serves web pages. The web pages (and the WML card(s) contained therein) being provided by the server may be accessed by the user either via browsing or via searching in the normal manner. Thereafter, computer 131 returns to act 171 to wait for the next request. In act 172 if the request is for audio content, e.g. request identifies PERL script prepPlayer.pl as discussed above in reference to cell phone 110 in act 154 (described above in relation to FIG. 8), computer 131 goes to act 174 (FIG. 10A).

In act 174, computer 131 saves the subscriber identifier of the user, and an identifier of the selected audio content, e.g. the number 100001. In the illustrative implementation of prepplayer.pl, computer 131 identifies the audio content file to be played to the user via an SQL query to database 132 (FIG. 6A) that contains a number of tables (FIGS. 10B–10E), e.g. as illustrated in detail in Appendix D. In database 132, a field "body_file" in table "content" (FIG. 10B) contains the path name of the file containing the audio content to be played, e.g. if the "body_type" field has the value "A" thereby to indicate that this file contains audio (another value "T" indicates that the file contains text). This table also contains a "description" field that identifies a description 112 (FIG. 2) of the type described above.

Note that in this implementation, the content table (FIG. 10B) may contain a number of records that identify a corresponding number of versions of contents that fit the same "description" (e.g. if there is an hourly news feed, there may be 24 such records for an entire day). Such multiple records are differentiated by the value in the field "crawl_id" in table "content" which is incremented when creating each record in the table. A corresponding "crawl_id" field in another table "subcategory" (FIG. 10C) identifies the largest value, and is used by the SQL query in prepPlayer.pl to identify the latest audio content.

The subcategory table (FIG. 10C) also contains a "description" field that identifies the type of audio contents in a subcategory, e.g. audio contents that are "editorial" or "gossip" as in a newspaper, or more specifically as "CNN News." The subcategory table further contains a "prompt_file" field that identifies the path of a file of audio content that is to be played to provide the user with context (e.g. the audio contents may contain the spoken words "CNN News"). The subcategory table also contains a "category_id" field that identifies, in the hierarchy of menus, as to which category the subcategory described by this record belongs. For example, the subcategory of "CNN News" is identified as belonging to the "News" category by the value "1" that identifies a unique record in the "category" table (FIG. 10D).

The category table (FIG. 10D) also contains a "description" field that identifies the type of subcategories, and also a "prompt_file" field that identifies a file containing audio content to be played, again to provide context to the user. The user is identified by records in a user table (FIG. 10E) that contains a "subscriber_id" field that is used in this embodiment to uniquely identify the user based on their WAP session. Note that depending on the embodiment, other mechanisms may be used to identify a user.

Returning to the method 170 (FIG. 10A), after performing the database query, computer 131 saves such information, for example in a file called "state file" that identifies the audio file to be played to each user by computer 135. Alternatively, such information may be saved in a record of a shared database that is accessible from both computers 131 and 135. For example, see the "open", "print" and "close" statements in prepPlayer.pl in Appendix B. Note that although in this example a fixed file name "Content1.txt" was used, if multiple users are to be serviced, the number "1" in the file name is to be replaced by the user's subscriber ID or user's cell phone number. Note that computer 135 that receives this file uses the user's subscriber ID or user's cell phone number from an incoming call to identify the relevant file to be used in playing the audio contents.

Alternatively, if each user is assigned a different phone number for calling in by computer 131, the phone number itself may be used in the file name; and computer 135 identifies the file from the phone number dialed by cell phone 110 (the dialed phone number is known by computer 135 because as noted below, computer 135 waits on one or more such telephone numbers at the corresponding ports of a call processing board). Note that instead of calling a local number, cell phone 110 may call a "1-888" or "1-800" number that is translated in the normal manner into a corresponding local number that is being used by computer 135 to play audio. Therefore, in another embodiment, the phone number dialed by cell phone 110 is not the same as the phone number on which computer 135 is waiting, but is translated therefrom, e.g. when a call comes in from cell phone 110.

In act 175, computer 131 uses an available telephone number to create a file of instructions to be executed by cell phone 110 (e.g. generates a wml card as illustrated by the "print<<END" statement and the rest of the text to the end of the PERL script prepPlayer.pl). Next, in act 176, computer 131 sends the created file to cell phone 110 and returns to act 171 (which may happen implicitly on completion of the PERL script, for example).

Computer 131 removes the telephone number from, e.g. a list of available telephone numbers. At a later time, e.g. after audio playback for this telephone number, computer 135 makes the telephone number available, e.g. adds the telephone number to the list. Computer 135 may also make the telephone number available after a predetermined time, e.g. in case an incoming call for this telephone number never arrives.

The example illustrated in prepPlayer.pl of Appendix B generates the following code in the card DoCall for execution by cell phone 110:

```
<card id="DoCall" ontimer="http://63.199.168.230/wml/
$returnToFile\#$returnToCard">
    <onevent type="onenterforward">
        <go href="wtai://wp/mc;16506526431"/>
    </onevent>
    <timer id="callWait" value="1"/>
</card>
```

In the above code, the "onevent" tag indicates that the telephone number 16506526431 is to be called when the event "onenterforward" occurs. So, as soon as cell phone 110 receives this code, the received phone number is immediately dialed. On completion of the phone call, the "callWait" timer causes cell phone 110 to wait for upto one-tenth second, depending on the embodiment. The amount of time depends on the implementation of cell phone 110, e.g. the timer may be started as soon as the card is loaded. On expiration of the timer, cell phone 110 goes to the URL provided by the "ontimer" variable, using as variables the values of retF and retC (described above).

Figure 11:
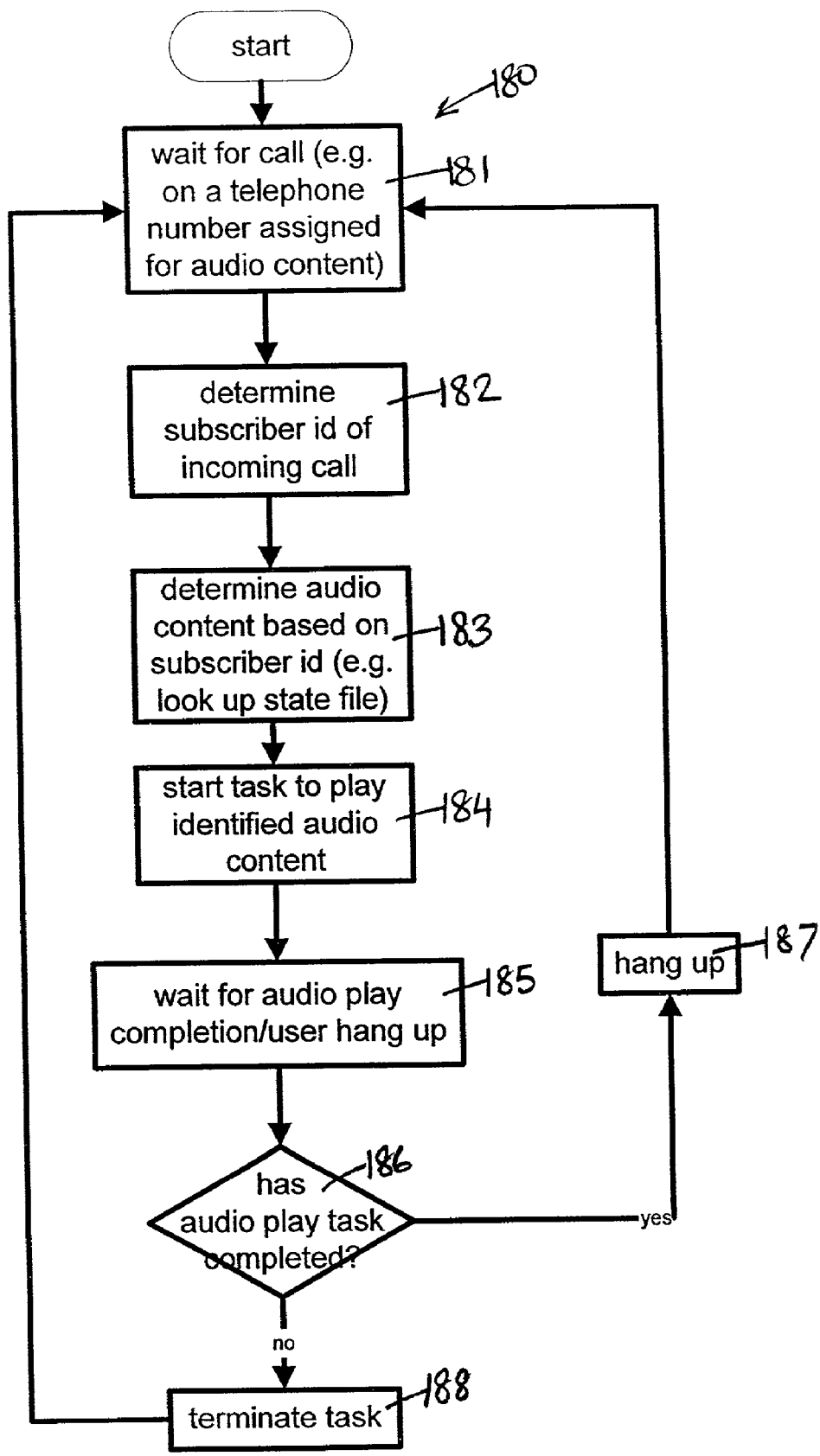
FIG. 11 illustrates, in a flow chart, supply of audio content in response to placement of a voice call as illustrated in FIG. 8.

In the above-described embodiment, computer 135 performs a method 180 (FIG. 11) to provide audio content over a voice call 127 to cell phone 110 (FIG. 6). Specifically, in act 181, computer 135 waits for a call. For example, computer 135 may wait on one or more telephone numbers at the corresponding ports of a call processing board that are to be used by cell phones 110. In the illustrative implementation shown in the attached Appendix C, see the statement "sc_wait(line)" in the file waptest.vs.

Depending on the implementation, a number of cell phones 110 may use the same telephone number (e.g. if a hunting group for multiple ports (to allow call connection to an unused port) has been established by arrangement with local telephone provider in the normal manner). Alternatively, computer 135 may wait for a call on any one of a number of telephone numbers that are reserved for each of or corresponding number of cell phones 110 that have requested audio content.

Next, in act 182, as soon as voice call is received, computer 135 determines the subscriber ID of the cell phone 110 that initiated the telephone call. For example, computer 135 may look at the caller id information accompanying the voice call. Alternatively, computer 135 may be waiting on a phone number that was assigned to a user and that was identified, e.g. in a file name by computer 131 as described above in reference to act 175 of FIG. 10. In yet another embodiment, a database lookup is performed to match the incoming phone number against a record that contaisn a user's identity, e.g. if computer 131 stored such information in the database.

Then, in act 183 (FIG. 11), computer 135 uses the state file or other information from computer 131 (e.g. from a database) to determine, based on the subscriber ID, the audio content that is to be played for the voice call received in act 182. In the illustrative implementation in the file waptest.vs, see the statement "fileHandle= . . . ". Next, in act 184, computer 135 starts a task that plays the audio content over the voice call 127 so that the audio content becomes available almost instantaneously via speaker 113 of cell phone 110 (FIG. 2). In the illustrative implementation in the file waptest.vs, see the statement "sc_play." While the task is running, computer 135 waits in act 185 for completion of the task or alternatively for the user to hang up on the voice call 127. In the illustrative implementation in the file waptest.vs, see the "while" loop.

In act 186, computer 135 checks to see if the task has completed. If so, computer 135 goes to act 187 to hang up on (e.g. tear down) voice call 127 and thereafter returns to act 181 to wait for another voice call. If the audio task has not completed in act 186, computer 135 goes to act 188 to terminate the task and thereafter returns to act 181. Instead of spawning a new task as described above in reference to 184, computer 135 may perform playing of the audio content in line in the current task, thereby to eliminate the overhead of spawning a new task. In such a case, computer 135 does not wait for completion of the audio playback and instead is responsive to the hang-up event of voice call 127 by cell phone 110. Such responsiveness can be implemented either by polling or by interrupt.

The to-be-played audio contents may be retrieved by computer 135, either through the Internet in real time (e.g. before the descriptions are provided to any users) or may be cached ahead of time for supply to users on demand. The to-be-played audio contents may also be captured from a live broadcast by television or radio studio that may be accessed through the Internet or in other conventional manner. Also, descriptions of the audio contents may be prepared manually, or pre-existing descriptions may be downloaded from Internet at the same time and from the same location as the audio contents (e.g. see website www.on24.com and website www.real.com).

Numerous modifications and adaptations of the embodiments described herein ill be apparent to the skilled artisan in view of the disclosure. Although in one embodiment, list 114 (FIG. 2) is limited to only audio content descriptions, in another embodiment such descriptions are interspersed among other descriptions, e.g. of text content that is available for visual display on selection. In such an embodiment, an icon (of a speaker) may be displayed to identify whether the content is text or audio or both, e.g. in the manner of www.cnn.com. Moreover, although certain software in the attached appendices is described for an illustrative embodiment, other embodiments will be apparent to the skilled artisan in view of the disclosure. Numerous such modifications and adaptations of the embodiments, variants and implementations are encompassed by the attached claims.

The invention claimed is:

1. A method of interfacing to a user, the method comprising:
   using a data connection to receive a plurality of descriptions of audio contents;
   receiving from the user a selection of a first description from among the plurality of descriptions;
   automatically placing a voice call to play a first audio content described by the first description in response to the selection; and
   returning to using the data connection to receive the descriptions of audio content in response to completion of the voice call.

2. The method of claim 1 wherein each audio content in the plurality is associated with a telephone number, the method further includes:
   using the data connection to receive a telephone number, and dialing the telephone number during the placing of voice call.

3. The method of claim 1 wherein the telephone number is hereinafter "first telephone number", the method further comprising, after termination of said voice call:
   receiving a plurality of additional descriptions of additional audio contents; and
   placing another voice call to a second telephone number, wherein said second telephone number is different from said first telephone number.

4. The method of claim 1 further comprising, after termination of said voice call:
   receiving a plurality of additional descriptions of additional audio contents; and
   placing another voice call to said telephone number to play an additional audio content.

5. The method of claim 4 further comprising:
   dynamically assigning a different one of a plurality of predetermined phone numbers to each of a plurality of descriptions to be displayed as a group to the user for selection therein.

6. The method of claim 1 further comprising:
   using the selection of first description identified by the data connection to play the audio content during the voice call.

7. The method of claim 1 wherein:
   each of the data connection and the voice call are respectively formed with a first logic and a second logic; and
   the method includes the first logic providing information about the user to the second logic.

8. The method of claim 7 wherein:
   the information being provided includes an identifier of an audio content currently described to the user.

9. The method of claim 8 further comprising:
   receiving a plurality of calls from a corresponding plurality of users; and
   matching the audio content to be played with a call, based on an identifier obtained from a wireless handset of the user.

10. The method of claim 7 further comprising:
retrieving each of the audio contents from the Internet.
11. The method of claim 1 further comprising:
visually displaying the descriptions on a monitor of a wireless handset.
12. The method of claim 11 further comprising, prior to said using:
using the data connection to receive a plurality of categories;
visually displaying the categories on the monitor; and
requesting said plurality of descriptions in response to selection of a category in said plurality of categories;
wherein said plurality of descriptions are all classified under said category.
13. The method of claim 11 wherein:
the selected category is news;
each description is a news headline; and
each of the audio contents is a news report that provides details related to said news headline.
14. The method of claim 11 further comprising:
using the data connection to receive a plurality of additional categories;
visually displaying the additional categories on the monitor; and
requesting said plurality of categories in response to selection of an additional category.
15. The method of claim 1 further comprising:
terminating the voice call on completion of playing of the first audio content.
16. The method of claim 1 wherein:
the data connection is suspended during the voice call.
17. The method of claim 1 wherein:
each description is different in content from another description.
18. The method of claim 1 wherein:
during the act of visually displaying, telephone numbers corresponding to the descriptions are not displayed.
19. The method of claim 1 further comprising:
displaying a telephone number to be used in the voice call in response to the selection; and
performing said placing of voice call only after receiving a response from the user to dial the phone number being displayed.
20. The method of claim 19 wherein:
said receiving a response is one of: detecting pressing of a button, detecting touching of a monitor, and detecting a voice command.
21. The method of claim 1 further comprising:
using the data connection to receive a plurality of phone numbers for a corresponding plurality of descriptions.
22. The method of claim 21 wherein:
said phone numbers and said descriptions are received as portions of a single message.
23. The method of claim 21 wherein:
said descriptions are received in a first message; and
said phone numbers are received in a second message.
24. The method of claim 1 further comprising:
transmitting the selection over the data connection; and
receiving from the data connection a telephone number to be used during said placing of voice call.
25. The method of claim 1 wherein:
each of said acts of using data connection and placing voice call includes using a wireless medium.
26. The method of claim 1 wherein:
said voice call is not a Voice Over IP call.
27. A method of interfacing to a user, the method comprising:
using a data connection to receive a description of an audio content;
receiving from the user a command to play the audio content;
automatically placing a voice call to play the audio content in response to the command; and
returning to using the data connection to receive at least one of the group of: the description of the audio content and a description of another audio content, in response to completion of the voice call.
28. The method of claim 27 further comprising:
each of the data connection and the voice call are respectively formed with a first logic and a second logic; and
the method includes the first logic providing information about the user to the second logic.
29. The method of claim 29 wherein:
the information being provided includes an identifier of an audio content currently described to the user.
30. A method of interfacing to a user, the method comprising:
using a data connection to receive a number of descriptions of audio content;
displaying the descriptions to the user;
receiving from the user a command to play one of the audio contents described by the descriptions;
placing a voice call in response to the command;
playing said audio content to the user during the voice call; and
returning to using the data connection to receive the descriptions of audio content in response to completion of the voice call.
31. The method of claim 30 further comprising:
using an available telephone number to generate an instruction for said placing of voice call.
32. The method of claim 31 further comprising:
forming an association between said telephone number and said audio content; and
using said association on receipt of said voice call at said telephone number in identifying said audio content for said playing.
33. The method of claim 31 further comprising:
identifying the user on receipt of said voice call; and
using identity of the user on receipt of said voice call to identify said audio content for said playing.
34. The method of claim 30 further comprising:
displaying to the user a plurality of categories of audio contents; and
receiving from the user a selection of a category prior to said using of data connection.
35. The method of claim 34 wherein:
at least one of said categories relates to news; and
each description in said plurality identifies a news service.
36. The method of claim 34 further comprising:
displaying to the user a plurality of subcategories of audio contents; and
receiving from the user a selection of a subcategory prior to said using of data connection;
wherein each subcategory relates to a news service and each description relates to a headline of a news story.
37. A computer readable storage medium encoded with instructions to perform the method of claim 30.
38. A signal encoded in a carrier medium and including instructions to perform the method of claim 30.

* * * * *